F. B. JAGER.
AUDIT ACCOUNT BOOK.
APPLICATION FILED MAR. 5, 1920.

1,408,741.

Patented Mar. 7, 1922.
5 SHEETS—SHEET 1.

INVENTOR
Frank B. Jager.
BY
Chapin & Neal
ATTORNEYS.

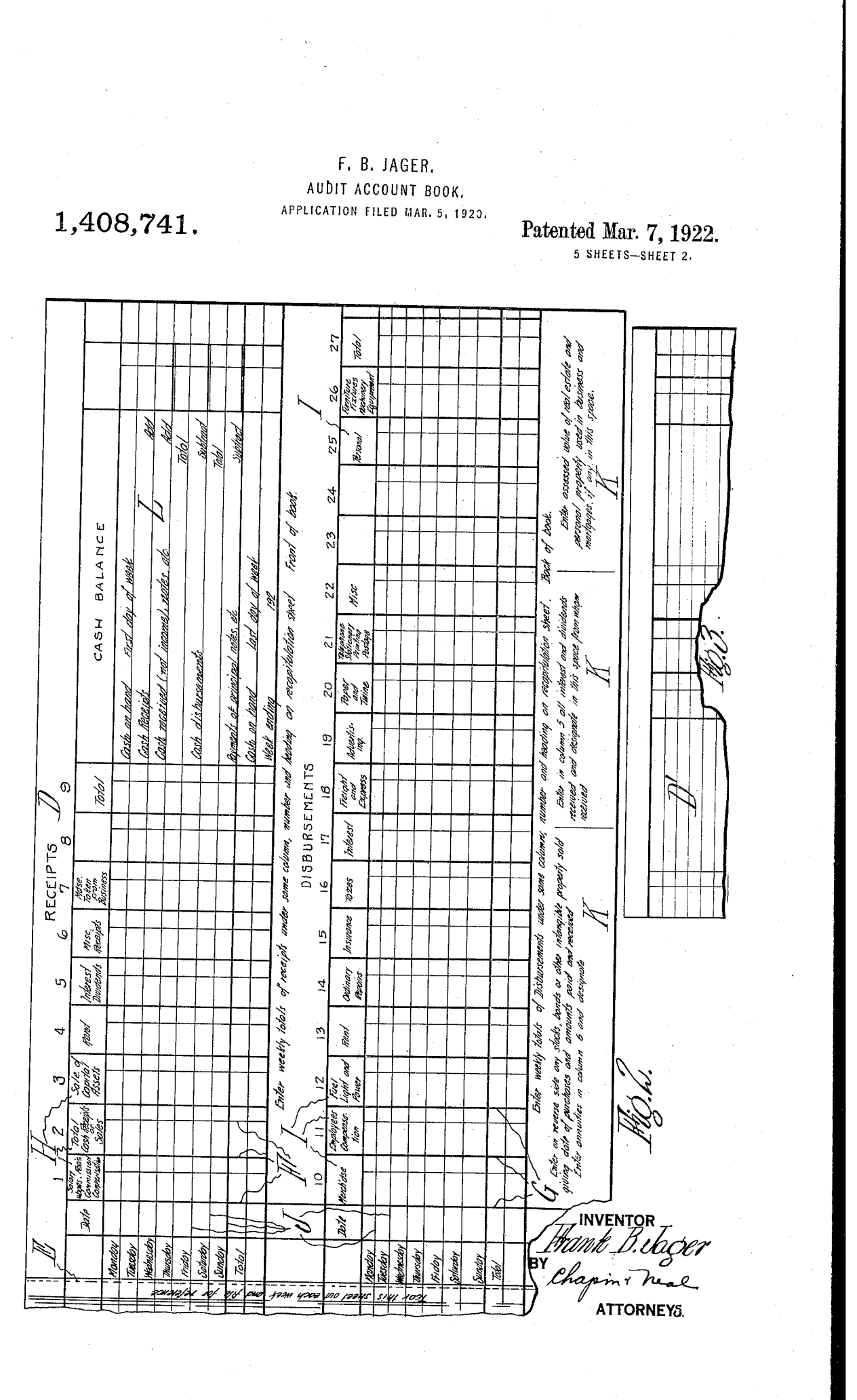

F. B. JAGER.
AUDIT ACCOUNT BOOK.
APPLICATION FILED MAR. 5, 1920.

1,408,741. Patented Mar. 7, 1922.
5 SHEETS—SHEET 2.

F. B. JAGER.
AUDIT ACCOUNT BOOK.
APPLICATION FILED MAR. 5, 1920.

1,408,741.

Patented Mar. 7, 1922.
5 SHEETS—SHEET 3.

Fig. 4.

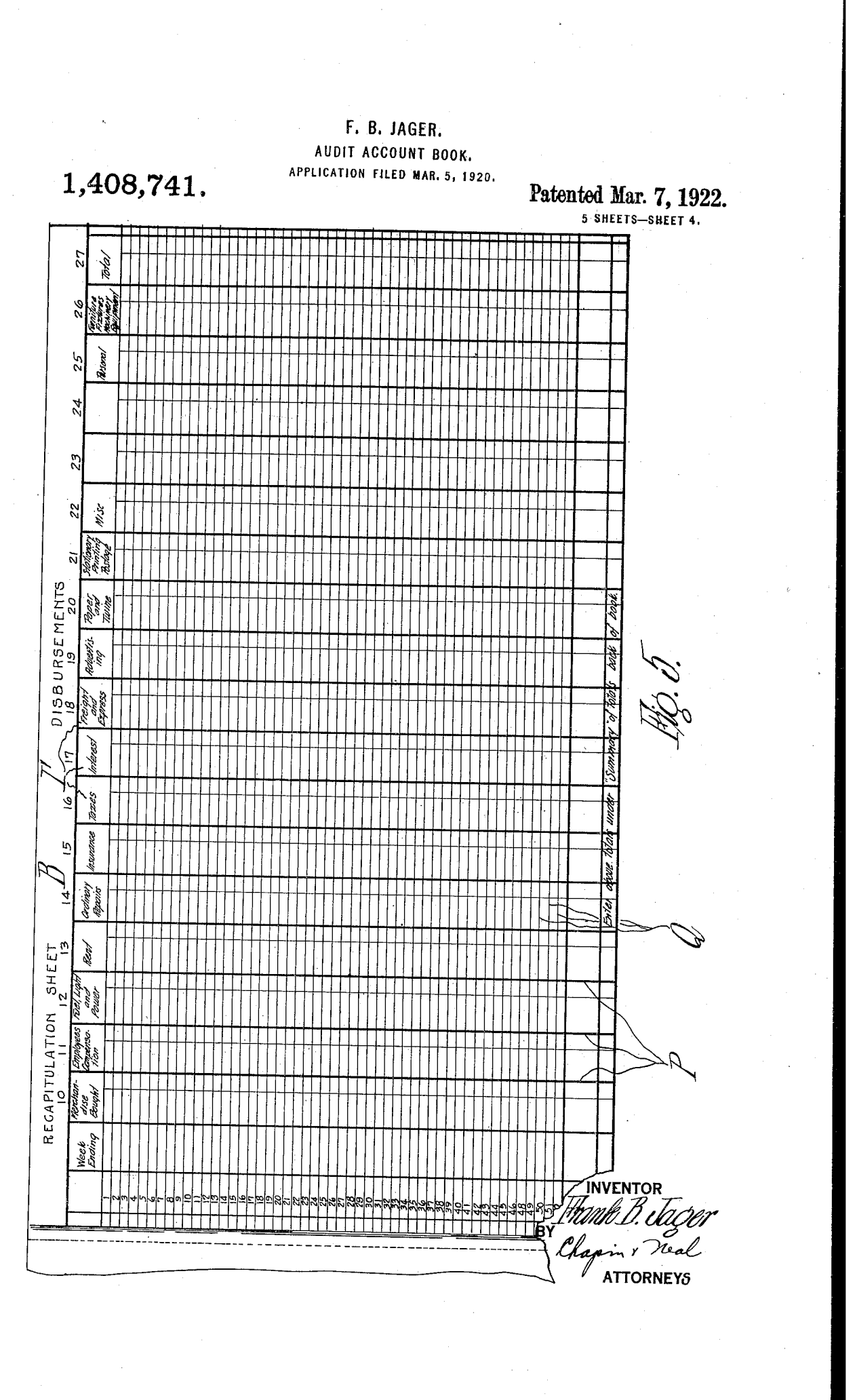

F. B. JAGER.
AUDIT ACCOUNT BOOK.
APPLICATION FILED MAR. 5, 1920.

1,408,741.

Patented Mar. 7, 1922.
5 SHEETS—SHEET 4.

*Fig. 5.*

INVENTOR
Frank B. Jager
BY
Chapin & Neal
ATTORNEYS

F. B. JAGER.
AUDIT ACCOUNT BOOK.
APPLICATION FILED MAR. 5, 1920.

1,408,741.

Patented Mar. 7, 1922.
5 SHEETS—SHEET 5.

Fig. 6.

SUMMARY OF TOTALS

RECEIPTS
1. Salary, Wages, Fees, Commission, Compensation
2. Total cash receipts or total sales
3. Profit from sale of capital assets
4. Rent
5. Interest and dividends
6. Misc. receipts
7. Merchandise taken from stock
8.
9. Total DISBURSEMENTS
10. Merchandise
11. Employees Compensation
12. Fuel, Light and power
13. Rent
14. Ordinary Repairs
15. Insurance
16. Taxes
17. Interest
18. Freight and Express
19. Advertising
20. Bags and Twine
21. Telephone, Stationery, Printing, Postage
22. Miscellaneous
23.
24. Personal
25. Furniture, Fixtures, Machinery, Equipment
26. Total INVENTOR
Frank B. Jager.
BY
Chapin & Neal
ATTORNEYS.

UNITED STATES PATENT OFFICE.

FRANK B. JAGER, OF NORTHAMPTON, MASSACHUSETTS.

AUDIT ACCOUNT BOOK.

1,408,741.  Specification of Letters Patent.  Patented Mar. 7, 1922.

Application filed March 5, 1920. Serial No. 363,499.

*To all whom it may concern:*

Be it known that I, FRANK B. JAGER, a citizen of the United States of America, residing at Northampton, in the county of Hampshire and State of Massachusetts, have invented certain new and useful Improvements in Audit Account Books, of which the following is a specification.

This invention relates to an audit account book so arranged as to provide for a convenient and accurate method of keeping a daily account of expenditures and receipts, which may be summarized into weekly totals. The system herein outlined is more applicable to the keeping of an accurate account for income tax returns and for this purpose suitable itemized headings are employed to conform to the requirements of such income tax laws as may be in force.

A convenient feature of the present account book is that when the entries for any one period of time, for instance one week, have been made, the totals for that period may be posted to a recapitulation sheet at one side of the book and the weekly sheet of original entry may be removed from the book and filed for record. In this manner entries may be made chronologically and the original sheet of entry may always be on top to facilitate the making of entries and posting.

Furthermore, each sheet of original entry may be provided with means for the entering of a cash balance statement thereon at the end of a period, such as a week, and the balance on hand from such statement may be carried along from week to week upon the successive sheets as the sheets are removed to thereby indicate at a glance the present state of finances. In other words, by the use of the present account book the entry of all expenditures and receipts is made as simple as the writing of a personal check with its stub entry in an ordinary check book and at the end of the year a complete record is available for rendering an income tax return. Further advantages and improvements of the invention will be apparent from the following detailed description of the preferred embodiment of the invention.

Referring to the drawings,—

Fig. 2 is a view of the weekly sheet of original entry;

Fig. 3 is a view of the reverse side of the sheet shown in Fig. 2;

Fig. 4 is a view of the recapitulation sheet for receipts;

Fig. 5 is a view of the recapitulation sheet for disbursements; and

Fig. 6 is a view of the sheet for the summary of totals.

Figure 1:
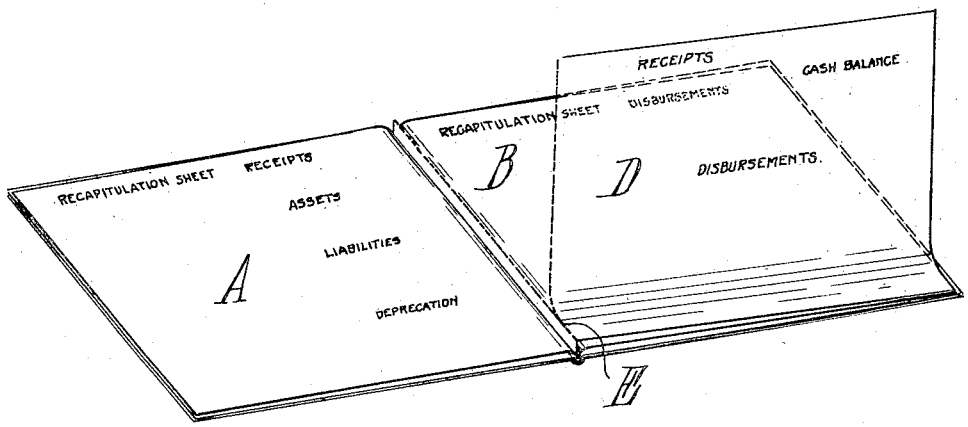
Fig. 1 is a perspective view of a book opened and the final sheet of original entry partially removed therefrom.

In the arrangement of the various sheets in the book, I prefer to locate the recapitulation sheet for receipts indicated at A at the front of the book and the recapitulation sheets for disbursements indicated at B at the back of the book. The sheet for the summary of totals indicated at C, may be on the reverse side of sheet B. Between the sheets A and B are located the sheets of original entry indicated as D and since in the present embodiment these sheets are designed for receiving the entries for one week, there will be fifty-three (53) of such sheets D located between the sheets A and B to cover the fifty-two (52) weeks and any fraction of a week remaining for the year. The sheets A and B are bound for permanent attachment in the book, but the intermediate sheets D are designed for temporary attachment in the book and for this purpose have a line of perforations E near the base thereof by which they may be easily torn out and removed from the book for the purpose to be described.

Referring now to a more particular description of the various sheets and the means thereon for receiving entries it will be noted that sheet D contains two separate groups of vertical columns, one set indicated at F under the general heading of "Receipts" and the other set of columns G under the general heading "Disbursements" (the lead lines for the reference characters indicating said columns are connected to the vertical lines which form the columns). The individual columns F have sub-headings H which may be of any suitable character to indicate the desired itemization of said receipts together with a sub-heading for totals and likewise the individual columns G have sub-headings I to indicate the desired itemization of disbursements as well as a sub-heading for totals. Furthermore, each individual column H and I is separately and consecutively numbered for convenience in posting and a vertical date column is also associated with each of the groups of columns F and G.

Each group of vertical columns F and G are traversed by horizontal rows indicated at J, which horizontal rows are designated by the different days of the week together with a horizontal heading for totals. Below the said groups of columns F and G, spaces K are provided for receiving appropriate directions and detailed explanation of entries. There is also provided on the sheet D a space L with suitable headings and columns for the entry of a cash balance statement at the end of the period covered by the sheet and in the present instance, one week. The reverse side of sheet D and indicated as D', is marked off with suitable lines and vertical columns similar to an ordinary ledger sheet for receiving additional entries as to the purchase and sale of property from which the profit is desired for entry on sheet D.

Referring now to the recapitulation sheet A for receipts, this likewise contains a group of vertical columns M numbered and with sub-headings H' corresponding to the numbers and the sub-headings H of the group of columns F on sheet D, two of said columns being appropiately headed for the reception of dates and totals. The vertical columns M are also traversed by horizontal rows N, fifty-three (53) in number, and designated by numbers at the left hand end thereof to indicate the fifty-two (52) weeks and any fraction of a week remaining for the year. A space O is also provided on sheet A with suitable headings for the entry of a financial statement of assets and liabilities whereby at the end of the year the condition of the business may be set forth. A space O' is also provided for listing items subject to depreciation.

Sheet B also contains a group of vertical columns P numbered and with sub-headings I' corresponding to the sub-headings and numbers of columns I, two of said vertical columns P being appropriately headed for the reception of dates and totals respectively. The vertical columns P are traversed by horizontal rows Q, fifty-three (53) in number, which are designated at the left hand end by numbers 1 to 53 for the fifty-two (52) weeks and the remaining part of a week for the year. Sheet C under the heading of "Summary of totals", contains a group of vertical columns R traversed by horizontal rows S, the vertical colums having two sub-headings "Receipts" and "Disbursements" and the horizontal rows designated and numbered by the same sub-headings as occur under the headings "Receipts" and "Disbursements" on sheet D whereby a summary of totals for the year may be entered.

The use of the present account book will be understood from the foregoing brief description but may be briefly summarized as follows: Daily entries of receipts and disbursements are made upon the sheet D under their appropriate headings and dates during the period of one week. At the end of the week totals of the vertical columns are posted under the corresponding headings of the recapitulation sheet and the totals of receipts and disbursements respectively are entered on the cash balance statement of sheet D to determine the cash on hand at the end of the week and which is to be carried over. Sheet D is then torn from the book along its line of perforation. The total of cash on hand is carried over to the cash balance statement on the next page and the process of entering the receipts and disbursements as they occur is repeated as on the previous sheet. The sheets D of original entry as they are torn from the book, may be filed for reference and record. Such records will be of value in making weekly comparisons to show the progress of the business from year to year.

The convenience resulting from removing these sheets after the entries thereon are completed will be apparent when it is observed that the sheet of original entry is always presented at the top upon opening the book with the recapitulation sheet for receipts upon the left, similar to the stub of a check book, and the recapitulation sheet for disbursements at the back of the book, thus avoiding the necessity of pawing over the different sheets to find the proper sheet for entry.

What I claim is—

1. An account book of the class described, adapted for use in connection with the making of income tax returns comprising a plurality of removable sheets of original entry suitably ruled to provide spaces suitably designated for the reception of items required in income tax returns and each adapted to receive entries of transactions occurring during a specified period of time, and non-removable recapitulation sheets so arranged relative to said removable sheets as to be readily accessible at all times and ruled to provide appropriately designated spaces for the reception of the totals from said removable sheets, the said spaces for the reception of the totals of each sheet being numbered in the order in which the sheets are to be removed.

2. An account book of the class described comprising non-removable recapitulation sheets located one at the front and one at the back respectively of said book and each provided with suitably designated spaces for the entry of totals, the totals entered upon the two separate sheets being generally classifiable under separate headings, and a plurality of removable sheets of original entry interposed between said front and back non-removable sheets, each of said removable sheets being provided with suitably designated spaces for the reception of data relative to transactions covering specified periods of time, said removable sheets being adapted to be removed according to the order in which they occur in the book whereby the non-removable sheet at the front of the book is always located adjacent to the removable sheet next to be removed.

3. An audit account book comprising a group of original entry columns under the general heading of receipts, and separately designated with suitable sub-headings for receiving a distribution of receipts, a group of original entry columns under the general heading of disbursements and separately designated with suitable sub-headings for receiving a distribution of disbursements, a group of recapitulation columns under the general heading of receipts for receiving the totals of said original entry columns of receipts and a group of recapitulation columns under the general heading of disbursements for receiving the totals of the original entry columns of disbursements, the group of recapitulation columns for receipts being located on one sheet and the group of recapitulation columns for disbursements being located on another sheet, said sheets being located one at the front and one at the back of the book, the original entry columns of receipts and disbursements being located upon sheets between the aforesaid sheets of the recapitulation columns, said intermediate sheets of original entry columns being detachably secured to said book so as to be successively removed therefrom as the entries thereon are completed.

4. An audit account book comprising a group of original entry columns under the general heading of receipts, and separately designated with suitable sub-headings for receiving a distribution of receipts, a group of original entry columns under the general heading of disbursements and separately designated with suitable sub-headings for receiving a distribution of disbursements, a group of recapitulation columns under the general heading of receipts for receiving the totals of said original entry columns of receipts and a group of recapitulation columns under the general heading of disbursements for receiving the totals of the original entry columns of disbursements, the group of recapitulation columns for receipts being located on one sheet and the group of recapitulation columns for disbursements being located on another sheet, said sheets being located one at the front and one at the back of the book, the original entry columns of receipts and disbursements being located upon sheets between the aforesaid sheets of the recapitulation columns, each sheet of original entry columns having columns and items upon which a cash balance statement may be entered.

5. An audit account book comprising a group of original entry columns under the general heading of receipts, and separately designated with suitable sub-headings for receiving a distribution of receipts, a group of original entry columns under the general heading of disbursements and separately designated with suitable sub-headings for receiving a distribution of disbursements, a group of recapitulation columns under the general heading of receipts for receiving the totals of said original entry columns of receipts and a group of recapitulation columns under the general heading of disbursements for receiving the totals of the original entry columns of disbursements, the group of recapitulation columns for receipts being located on one sheet and the group of recapitulation columns for disbursements being located on another sheet, said sheets being located one at the front and one at the back of the book, the original entry columns of receipts and disbursements being located upon sheets between the aforesaid sheets of the recapitulation columns, said intermediate sheets of original entry columns being provided with properly designated spaces for explanation of the items entered in the columns of said sheet.

6. An audit account book comprising a group of original entry columns under the general heading of receipts, and separately designated with suitable sub-headings for receiving a distribution of receipts, a group of original entry columns under the general heading of disbursements and separately designated with suitable sub-headings for receiving a distribution of disbursements, a group of recapitulation columns under the general heading of receipts for receiving the totals of said original entry columns of receipts and a group of recapitulation columns under the general heading of disbursements for receiving the totals of the original entry columns of disbursements, the group of recapitulation columns for receipts being located on one sheet and the group of recapitulation columns for disbursements being located on another sheet, said sheets being located one at the front and one at the back of the book, the original entry columns of receipts and disbursements being located upon sheets between the aforesaid sheets of the recapitulation columns, said book also having a page for a yearly summary of totals itemized under the headings, "Receipts" and "Disbursements" said itemized headings having designations corresponding to the designations of the original entry columns and the recapitulation columns.

7. An account book of the class described, comprising a plurality of removable sheets each of which is adapted to constitute a sheet of original entry for transactions covering a specified period of time and each of said sheets being provided with suitably designated spaces for the entry of receipts and disbursements during the period specified, and non-removable recapitulation sheets located one at the front and one at the back respectively of said book, one of said recapitulation sheets being provided with suitably designated spaces for receiving the total receipts from said removable sheets in the order of their removal, and the other of said recapitulation sheets being provided with suitably designated spaces for receiving the total disbursements from said removable sheets in the order of their removal.

8. An account book of the class described comprising a plurality of removable sheets adapted to serve as sheets of original entry and each of which is provided with a group of original entry columns under the general heading of receipts, and separately designated with suitable sub-headings for receiving a distribution of receipts, and a group of original entry columns under the general heading of disbursements separately designated with suitable sub-headings for receiving a distribution of disbursements, and non-removable recapitulation sheets located one at the front and one at the back of said book respectively, one of said recapitulation sheets being provided with suitably designated spaces for receiving the totals of the receipts from said removable sheets in the order of their removal, and the other of said recapitulation sheets being provided with suitably designated spaces for receiving the totals of the disbursements from said removable sheets in the order of their removal.

9. An account book of the class described comprising a plurality of removable sheets each of which is provided with a plurality of appropriately designated spaces, said sheets constituting sheets of original entry for transactions covering a specified period of time, and one or more non-removable recapitulation sheets each of which is provided with spaces corresponding to certain of the spaces formed on the removable sheets and similarly designated for receiving in regular order the totals from said removable sheets.

Signed at Springfield, in the county of Hampden and State of Massachusetts this 3rd day of March, 1920.

FRANK B. JAGER.